March 9, 1954

W. C. McCULLOUGH 2,671,289

BAIT CASTING APPARATUS

Filed Oct. 15, 1951

William C. McCullough
INVENTOR.

BY *Clarence A. O'Brien*
*and Harvey B. Jacobson*
Attorneys

March 9, 1954 W. C. McCULLOUGH 2,671,289
BAIT CASTING APPARATUS
Filed Oct. 15, 1951 2 Sheets-Sheet 2
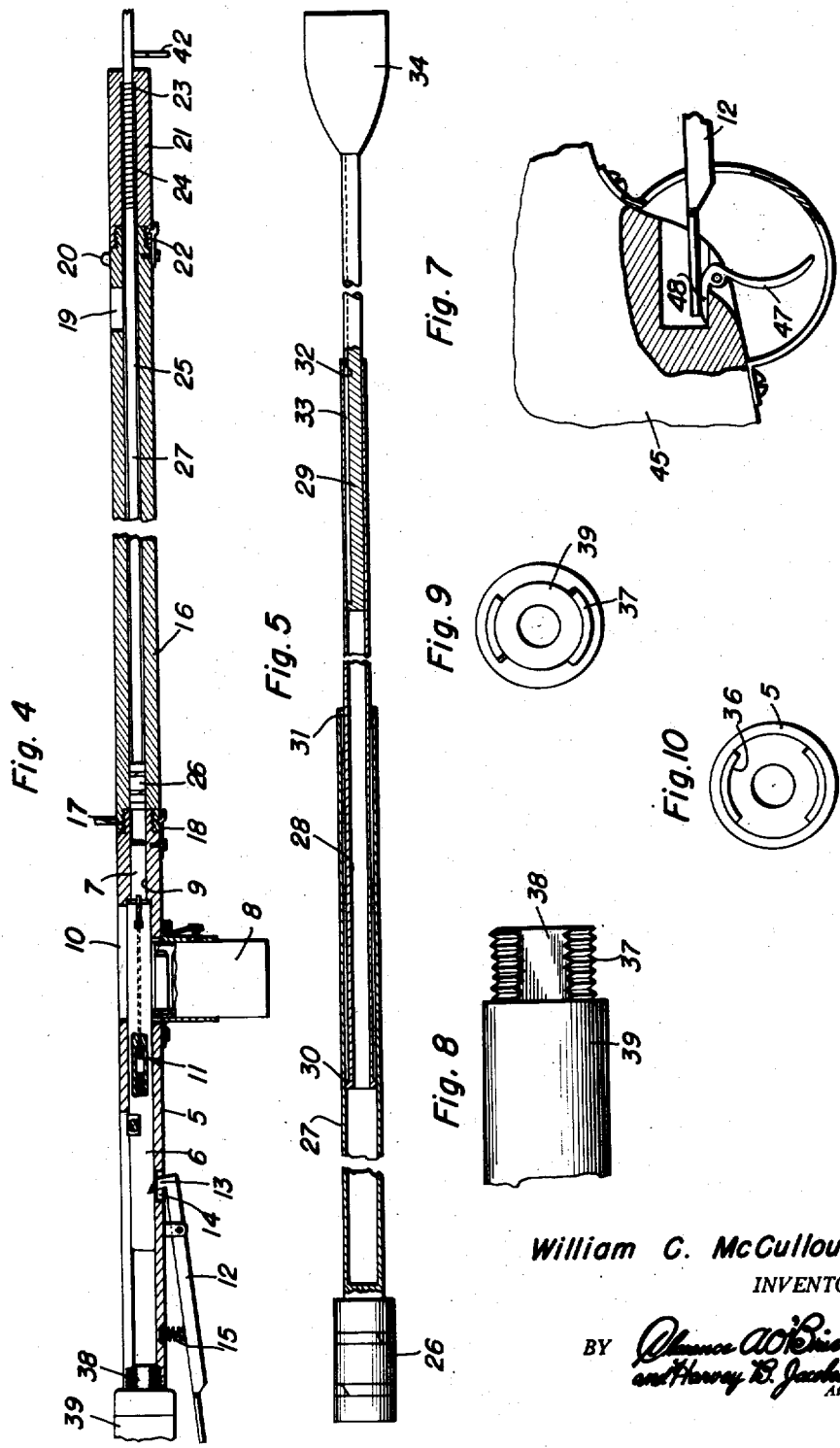
William C. McCullough
INVENTOR.

Patented Mar. 9, 1954

2,671,289

UNITED STATES PATENT OFFICE 2,671,289

BAIT CASTING APPARATUS

William C. McCullough, Sandpoint, Idaho, assignor of one-half to C. R. McCullough, Kalispell, Mont.

Application October 15, 1951, Serial No. 251,367

3 Claims. (Cl. 43—19)

The present invention relates to new and useful improvements in fishing poles and more particularly to a mechanical bait casting apparatus carried by the pole.

An important object of the invention is to provide a mechanism utilizing an explosive charge as the ejecting means for a bait holder to cast an artificial lure or plug.

Another object is to provide a barrel equipped with a cartridge loading and firing mechanism for ejecting the extensible outer end of a fishing rod, and providing means for interchangeably attaching the barrel to a gun stock or to the handle of a fish rod.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, references being had to the accompanying drawings forming a part hereof, wherein like numerals refer to like parts throughout and in which:

Figure 4 is an enlarged longitudinal sectional view of the barrel;

Figure 5 is an enlarged longitudinal sectional view of the ejecting rod and plunger;

Figure 7 is an enlarged sectional view of the trigger mechanism;

Figure 8 is an enlarged fragmentary side elevational view of the interrupted threads for attaching the barrel;

Figure 9 is an end elevational view thereof; and

Figure 10 is a rear elevational view of the barrel.

Figure 1:
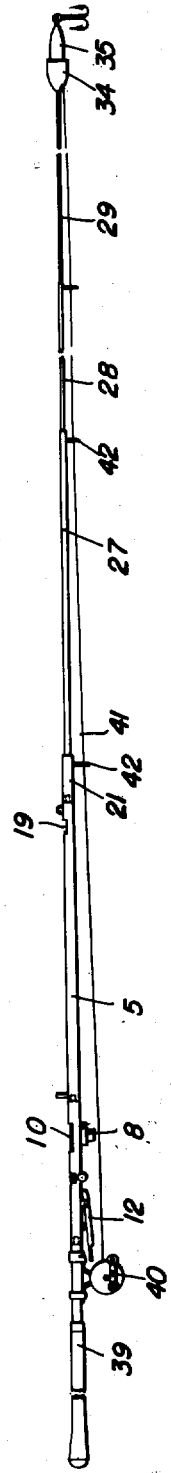
Figure 1 is a side elevational view showing the barrel attached to the handle of a fishing rod.

Referring now to the drawings in detail, wherein for the purpose of illustration, I have disclosed a preferred embodiment of my invention, the numeral 5 designates a barrel having a conventional type sliding bolt 6, such as used with firearms, to load a blank cartridge 7 from a magazine or cartridge clip 8 into the firing chamber 9, firing the cartridge, and ejecting the empty shell through the opening 10. The spring actuated firing mechanism is shown generally at 11 and is contained inside the sliding bolt and is released by a pivoted lever 12 at the underside of the barrel and having an angular finger 13 at its front end entering one side of the bolt through an opening 14 in the barrel to replace the usual trigger of the firearm in firing the cartridge.

A spring 15 is positioned between the barrel and the rear portion of the lever to hold the finger upwardly in the bolt and is moved downwardly to release the firing mechanism by pressing the rear end of the lever upwardly against the barrel.

The barrel is provided with a removable front section 16 connected to the barrel immediately forward of chamber 9 by a threaded connection 17 which is locked by a spring catch 18 to hold the front section 16 from turning on the barrel. An exhaust port 19 and front sight 20 are provided at the front end of section 16.

A hollow tip 21 is threaded on the front end of front barrel section 16 and is also locked by a spring catch 22. The tip is formed at its front end with an internal shoulder 23 to provide a stop for the front end of a coil spring 24 positioned in the tip and surrounding an extensible plunger rod 25 which is slidable in the front section 16 and tip 21 and is provided at its rear end with a piston 26.

Plunger rod 25 is constructed of a rear tubular section 27, a center tubular section 28, and a front solid rod 29, telescoping one within the other. An external stop 30 is formed on the rear end of center section 28 striking an internal stop 31 at the front end of rear section 27 to check outward movement of the former, and the front end of center section 28 is formed with an internal stop 32 sliding in a longitudinal groove 33 in front rod 29 to check outward movement of the latter and also to prevent turning thereof in the center section.

The outer or front end of solid front rod 29 is formed with a substantially frusto-conical hollow bait holder 34 to receive a plug or artificial lure 35.

The rear end of barrel 5 is formed with internal interrupted threads 36 to quickly engage external interrupted threads 37 on a stem 38 on the handle portion 39 of a fishing pole and to which a reel 40 is attached, in the usual manner, immediately rearwardly of lever 12. A fishing line 41 leads from the reel through line guides 42 on the ejector rod sections 27, 28 and 29 and through an opening 43 in bait holder 34 for attaching to the plug 35.

The barrel 5 may be also interchangeably attached in a similar manner as heretofore described to a threaded stem 44 at the front end of a gun stock 45 to which reel 46 is attached by a reel holder 46. The gun stock is equipped with a trigger 47 having a rearwardly extending finger 48 at its upper end underlying the rear end of lever 12 to raise the lever in a firing movement.

Figure 3:
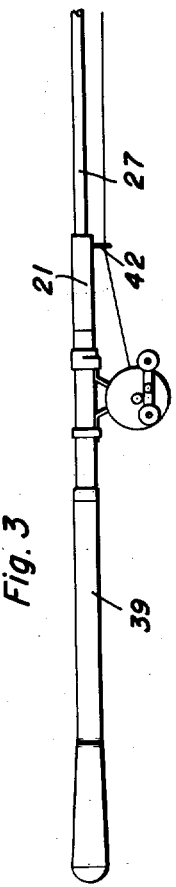
Figure 3 is a similar view showing the fishing rod handle used without the ejecting mechanism.
Figure 2:
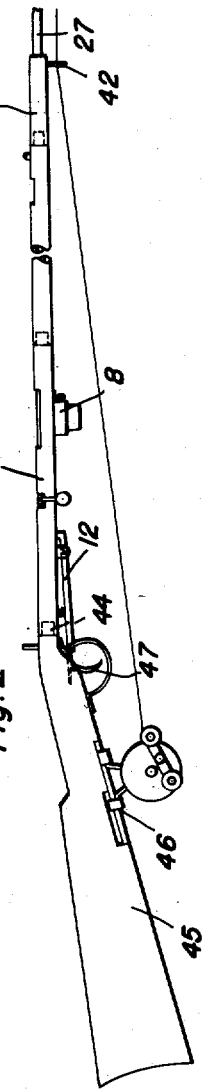
Figure 2 is a similar view showing the barrel attached to a gun stock.
Figure 6:
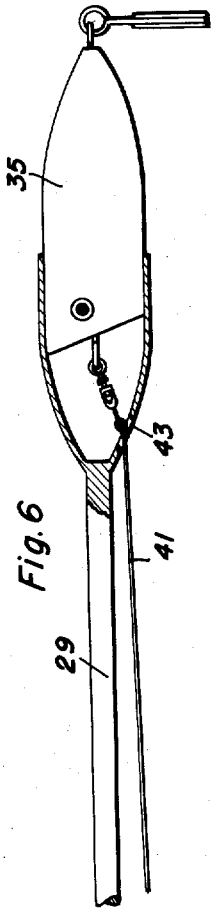
Figure 6 is an enlarged sectional view of the bait holder.

The device may also be used as an ordinary casting rod by detaching barrel 5 from the handle 39, then detaching hollow tip 21 from the outer end of the barrel, and attaching the tip directly to the handle, as shown in Figure 3. When used in this manner, the piston 26 is pulled into the tip and held tightly against the outer end of the handle by spring 24. The telescoping sections 28 and 29 will slide outwardly as the bait is cast.

In the operation of the device when using the barrel 5 attached to handle 39, as shown in Figure 1, the telescoping sections 27, 28 and 29 are pulled inwardly by plug 35 in bait holder 34 to position piston 26 immediately in front of the blank cartridge loaded in chamber 9, when line 41 is reeled inwardly. Lever 12 is then pressed upwardly to release the firing mechanism 11 to thus fire the cartridge which drives piston 26 forwardly and its forward momentum is suddenly checked by spring 24 to cause sections 28 and 29 to slide forwardly until also suddenly arrested by stops 30, 31 and 32 to propel the bait 35 outwardly. The exploded charge is exhausted through port 19 and the bolt 6 manipulated in the usual manner to eject the shell and reload the barrel.

When a gun stock 45 is substituted for handle 39, the trigger 47 actuates the lever 12 to fire the cartridge and cast the bait.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. In an artificial bait casting device, the combination of a barrel including an internal cartridge loading, firing and shell ejecting mechanism, a plunger slidably mounted in the barrel and including a bait holder at the front end of the plunger, a check carried by the barrel to suddenly arrest outward movement of the plunger, and means at the rear end of the barrel for attaching to a hand gripping member, said plunger comprising a plurality of telescoping sections constituting a fishing rod, said sections being extended from the barrel upon firing of a cartridge within the barrel.

2. In an artificial bait casting device, the combination of a barrel including an internal cartridge loading, firing and shell ejecting mechanism, an actuating lever for said mechanism carried externally of the barrel, a plunger slidably mounted in the barrel and including a bait holder at the front end of the plunger, a check carried by the barrel to suddenly arrest outward movement of the plunger, and means at the rear end of the barrel for attaching to a hand gripping member, said plunger comprising a plurality of telescoping sections constituting a fishing rod, said sections being extended from the barrel upon firing of a cartridge within the barrel.

3. In an artificial bait casting device, the combination of a barrel including an internal cartridge loading, firing and shell ejecting mechanism, a plunger slidably mounted in the barrel and including a bait holder at the front end of the plunger, a check carried by the barrel to suddenly arrest outward movement of the plunger, a hand gripping member, and interrupted threaded connecting means between the barrel and said member, said plunger comprising a plurality of telescoping sections constituting a fishing rod, said sections being extended from the barrel upon firing of a cartridge within the barrel.

WILLIAM C. McCULLOUGH.

References Cited in the file of this patent

UNITED STATES PATENTS

| Number | Name | Date |
| --- | --- | --- |
| 305,873 | Williams | Sept. 30, 1884 |
| 583,016 | Bacon | May 25, 1897 |
| 1,290,855 | Wesson | Jan. 7, 1919 |
| 2,003,290 | Gurney | June 4, 1935 |
| 2,194,639 | Cole | Mar. 26, 1940 |
| 2,217,820 | Rowe | Oct. 15, 1940 |
| 2,499,379 | Garrett | Mar. 7, 1950 |
| 2,584,678 | Dewey | Feb. 5, 1952 |